US010151071B1

(12) United States Patent
Bjorge et al.

(10) Patent No.: US 10,151,071 B1
(45) Date of Patent: Dec. 11, 2018

(54) ANTI-SLAB HEIGHT CONTROL SYSTEM FOR A COLD PLANER

(71) Applicant: Caterpillar Paving Products Inc., Brooklyn Park, MN (US)

(72) Inventors: Jason R. Bjorge, Blaine, MN (US); Sean Laclef, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 1 day.

(21) Appl. No.: 15/621,532

(22) Filed: Jun. 13, 2017

(51) Int. Cl.
| | |
|---|---|
| *E01C 23/088* | (2006.01) |
| *E01C 23/02* | (2006.01) |
| *E01C 23/12* | (2006.01) |
| *F02D 29/00* | (2006.01) |
| *B65G 41/00* | (2006.01) |
| *B02C 21/02* | (2006.01) |

(52) U.S. Cl.
CPC .......... *E01C 23/088* (2013.01); *E01C 23/028* (2013.01); *E01C 23/127* (2013.01); *B02C 21/02* (2013.01); *B65G 41/003* (2013.01); *F02D 29/00* (2013.01)

(58) Field of Classification Search
CPC .............................. E01C 23/088; E01C 23/127
See application file for complete search history.

(56) References Cited

U.S. PATENT DOCUMENTS

| | | | |
|---|---|---|---|
| 5,116,162 A | 5/1992 | Burhite | |
| 8,733,845 B2 | 5/2014 | Bollinger | |
| 8,764,118 B1 | 7/2014 | Krishnamoorthy et al. | |
| 8,915,550 B2 * | 12/2014 | Jeevanantham | E01C 23/088 299/39.2 |
| 8,944,517 B2 * | 2/2015 | Franzmann | E01C 23/127 299/1.5 |
| 9,267,446 B2 | 2/2016 | Killion et al. | |
| 9,995,009 B2 * | 6/2018 | Vogt | E01C 23/127 |
| 2006/0216113 A1 | 9/2006 | Emerson | |
| 2012/0128419 A1 * | 5/2012 | Menzenbach | E01C 21/00 404/76 |

* cited by examiner

*Primary Examiner* — John J Kreck
(74) *Attorney, Agent, or Firm* — Miller, Matthias & Hull

(57) ABSTRACT

Disclosed is an anti-slab height control system and related method for regulating the elevational position of an anti-slab mounted to a cold planer configured for milling a roadway. The cold planer includes a milling drum. The system comprises an anti-slab, a position sensor, a controller and an actuator. The controller is configured to determine an actuator adjustment based on a predetermined height, position data and a cutting depth of the milling drum. The position data is indicative of a current elevational position of the anti-slab. The actuator is configured to move the anti-slab based on the actuator adjustment from the current elevational position to a first elevational position, wherein the bottom side of the anti-slab is disposed at the predetermined height above the roadway when the anti-slab is in the first elevational position.

20 Claims, 6 Drawing Sheets

ANTI-SLAB HEIGHT CONTROL SYSTEM FOR A COLD PLANER

TECHNICAL FIELD

This disclosure generally relates to a cold planer and, more particularly, to an anti-slab height control system for a cold planer.

Background

Cold planers, also known as pavement profilers, road milling machines or roadway planers, are machines designed for scarifying, removing, mixing or reclaiming material from the surface of bituminous or concrete roadways and similar surfaces. Cold planers typically have a plurality of tracks or wheels which adjustably support and horizontally transport the machine along the surface of the road to be planed. Cold planers also have a rotatable milling drum that may be mechanically or hydraulically driven to grind up and scrape off the top surface of the road over which the cold planer is driven. As the rotor grinds up the surface of the road, conveyors at the front of the cold planer transport the loose material and dump it into the bed of a truck driving in front of or to the side of the cold planer. The cold planer may drag an anti-slab apparatus over the unmilled portion of the roadway to avoid large slabs breaking off as the roadway is milled.

U.S. Pat. No. 9,267,446 ("Killion et al.") discloses a cold planer having an anti-slab disposed in front of the rotor and positioned just above the top of the road surface to break up the material and prevent the rotor from lifting up large chunks of material that are not readily conveyable. While beneficial, a system for controlling the height of the anti-slab above the roadway is desired.

Summary

In accordance with one aspect of the present disclosure, an anti-slab height control system for a cold planer is disclosed. The cold planer is configured for milling a roadway and includes a frame and a milling drum mounted to the frame. The anti-slab height control system comprises an anti-slab, a position sensor, a controller and an actuator. The anti-slab is mounted on the cold planer and includes a bottom side. The position sensor is in operable communication with the controller. The position sensor is configured to transmit position data to the controller. The position data is indicative of a current elevational position of the anti-slab. The controller is in operable communication with an actuator. The controller is configured to determine a first actuator adjustment based on a first predetermined height, the position data and a first cutting depth of the milling drum. The controller is further configured to transmit to the actuator the first actuator adjustment. The actuator is operably connected to the anti-slab and is configured to move the anti-slab based on the first actuator adjustment from the current elevational position to a first elevational position, wherein the bottom side of the anti-slab is disposed at the first predetermined height above an unmilled portion of the roadway when the anti-slab is in the first elevational position.

In accordance with another aspect of the present disclosure, a method of controlling an anti-slab mounted on a cold planer is disclosed. The cold planer includes a frame and a milling drum mounted to the frame and disposed at a cutting depth. The method may comprise: receiving, by a controller, position data from a position sensor, the position data indicative of a current elevational position of the anti-slab; determining, by the controller, a first actuator adjustment, the first actuator adjustment based on a first predetermined height, the position data and a first cutting depth of the milling drum; and automatically raising or lowering the anti-slab, by an actuator operably connected to the anti-slab, from a current elevational position to a first elevational position based on the first actuator adjustment, wherein a bottom side of the anti-slab is disposed at the first predetermined height above a roadway when the anti-slab is in the first elevational position.

In accordance with another embodiment of the present disclosure, a method of regulating an elevational position of an anti-slab mounted on a cold planer is disclosed. The cold planer includes a frame and a milling drum mounted to the frame. The milling drum is disposed at a cutting depth. The method may comprise: receiving, by a controller, a state selection from an anti-slab interface, wherein the state selection is one of activate or deactivate; receiving, by the controller, position data from a position sensor, the position data indicative of a current elevational position of the anti-slab; determining, by the controller, a first actuator adjustment based on a first predetermined height, the position data, and a first cutting depth of the milling drum; transmitting, by the controller, the first actuator adjustment to an actuator operatively connected to the anti-slab; and, if the state selection is activate, moving the anti-slab, by the actuator, from the current elevational position to a first elevational position, wherein a bottom side of the anti-slab is disposed at the first predetermined height above an unmilled portion of a roadway when the anti-slab is in the first elevational position.

These and other aspects and features of the present disclosure will be more readily understood when read in conjunction with the accompanying drawings.

BRIEF DESCRIPTION

DETAILED DESCRIPTION OF THE DISCLOSURE

Figure 1:
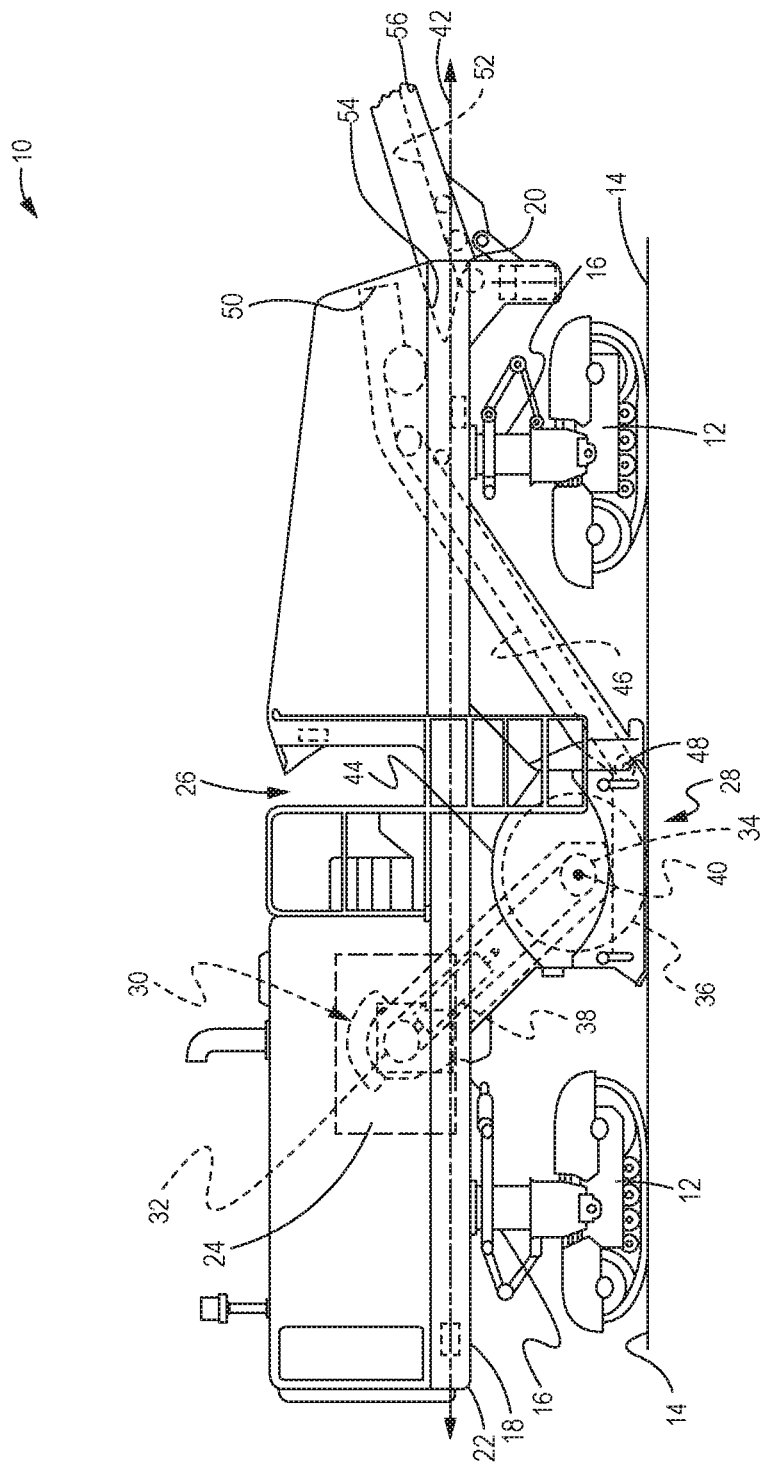
FIG. 1 is side view of an exemplary cold planer in accordance with the present disclosure.

Various aspects of the disclosure will now be described with reference to the drawings, wherein like reference numbers refer to like elements, unless specified otherwise. Referring now to the drawings and with specific reference to FIG. 1, an exemplary cold planer is disclosed and generally referred to by reference numeral 10. As is depicted therein, the cold planer 10 may include a plurality of ground engaging devices 12 configured to move the cold planer 10 over a roadway 14. While the plurality of ground engaging devices 12 depicted are endless tracks, another form is certainly possible. For example, a wheel or tire may be utilized with the cold planer 10 of the current disclosure.

Each ground engaging device of the plurality of ground engaging devices 12 may be operatively connected to a lifting column 16. The lifting column 16 may be connected to and support a frame 18 that longitudinally extends between a first end 20 and a second end 22 opposite the first end 20. Each lifting column 16 may be configured to raise and lower the frame 18 between a low position and a high position. Each lifting column 16 may act independently of another lifting column 16.

The frame 18 may support a power source 24 and an operator station 26. The power source 24 may be provided in any number of different forms including, but not limited to, Otto and Diesel cycle internal combustion engines, electric motors, gas turbine engines, or the like. The power source 24 may be rotatably connected to a milling system 28 suspended under the frame 18 via a milling drum drive system 30. The milling drum drive system 30 may include a first pulley 32 rotatably connected to the power source 24 at one end, and a second pulley 34 rotatably connected to a milling drum 36 at the other end. A driving mechanism 38, such as a belt or chain, may rotatably connect the first pulley 32 with the second pulley 34. As the power source 24 rotates, the first pulley 32 rotates, thereby causing the driving mechanism 38 to move. This in turn causes the second pulley 34 to rotate about a rotational axis 40 extending through the milling drum 36 transverse to a longitudinal axis 42 of the cold planer 10, causing the milling drum 36 to rotate. The milling drum 36 may be suspended under the frame 18. Thus, the vertical distance between the milling drum 36 and of the roadway 14 may be regulated by raising or lowering each lifting column 16. A milling chamber 44 may at least partially surround the milling drum 36.

A first conveyor system 46 may be connected to the milling chamber 44 at a first loading end 48, and upwardly extend through the frame 18 to end at a first unloading end 50 near the first end 20. A second conveyor system 52 may be connected to the cold planer 10 at a second loading end 54 at or near the first end 20. The second conveyor system 52 may extend between the second loading end 54 and a second unloading end 56 longitudinally positioned in front of the first end 20 in the direction of cold planer 10 travel T.

As the milling drum 36 rotates, the roadway 14 may be broken into pieces, which are subsequently loaded onto the first loading end 48 of the first conveyor system 46, and transferred to the first unloading end 50. Upon arriving at the first unloading end 50, the broken up pieces of the roadway 14 may fall onto the second loading end 54 of the second conveyor system 52, and afterwards discharged from the cold planer 10 at the second unloading end 56 into a pile or a waiting receptacle, such as a dump truck.

Figure 2:
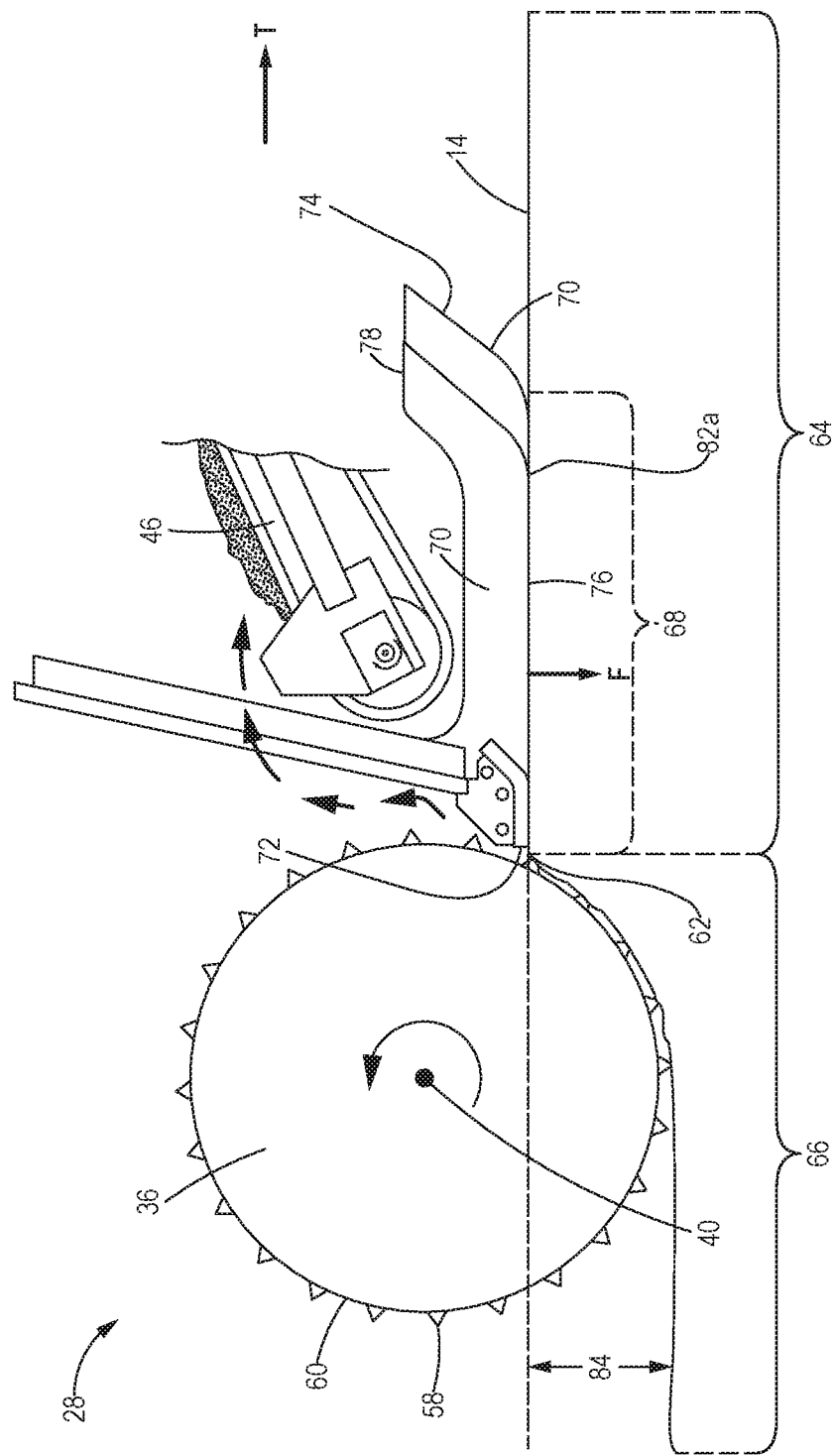
FIG. 2 is a side view of an exemplary milling system of the cold planer of FIG. 1.

FIG. 2 is a side view depicting the exemplary milling system 28 of the cold planer 10. As is seen therein, a plurality of work tools 58 may be disposed on an outer surface 60 of the milling drum 36. During certain milling operations, the milling drum 36 rotates opposite to the direction of travel T of the cold planer 10. As the cold planer 10 moves forward, the plurality of work tools 58 engage an edge 62 of an unmilled portion 64 of the roadway 14 and break it into pieces, leaving behind a milled portion 66 of the roadway 14. However, as is depicted by the dashed lines in the unmilled portion 64, sometimes the condition of the roadway 14 is such that as the plurality of work tools 58 engage an edge 62 of the unmilled portion 64, a large portion of the roadway 14, known in the art as a slab 68, may break away from the remaining unmilled portion 64.

The slab 68 is too large to efficiently be broken into small pieces by the milling drum 36 and carried away by the first conveyor system 46. Accordingly, the cold planer 10 may also include an anti-slab 70. The anti-slab 70 includes a trailing side 72, a leading side 74 and a bottom side 76 longitudinally extending in the direction of travel T between the trailing side 72 and the leading side 74. The trailing side 72 is proximal to the milling drum 36 and the edge 62 of the roadway 14, whereas the leading side 74 is distal to the milling drum 36 and the edge 62. The trailing side 72 and the leading side 74 each extend in an upward direction from the bottom side 76. The anti-slab 70 is positioned on the cold planer 10 to provide a downwardly directed force F on the slab 68 when the anti-slab 70 is in contact with the slab 68. This prevents the slab 68 from breaking away from the unmilled portion 64 of the roadway 14.

Figure 3:
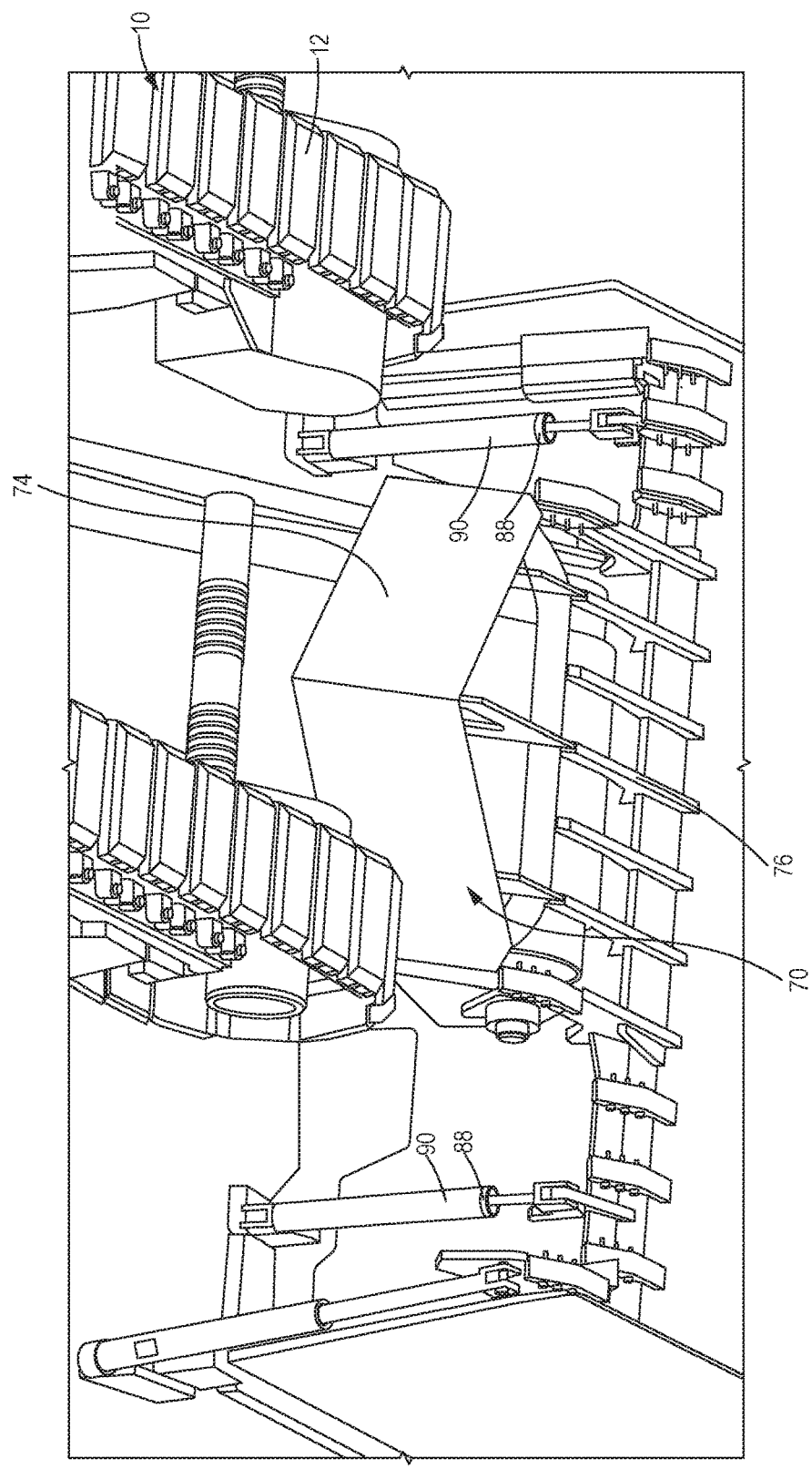
FIG. 3 is a perspective view of an embodiment of the anti-slab.
Figure 4:
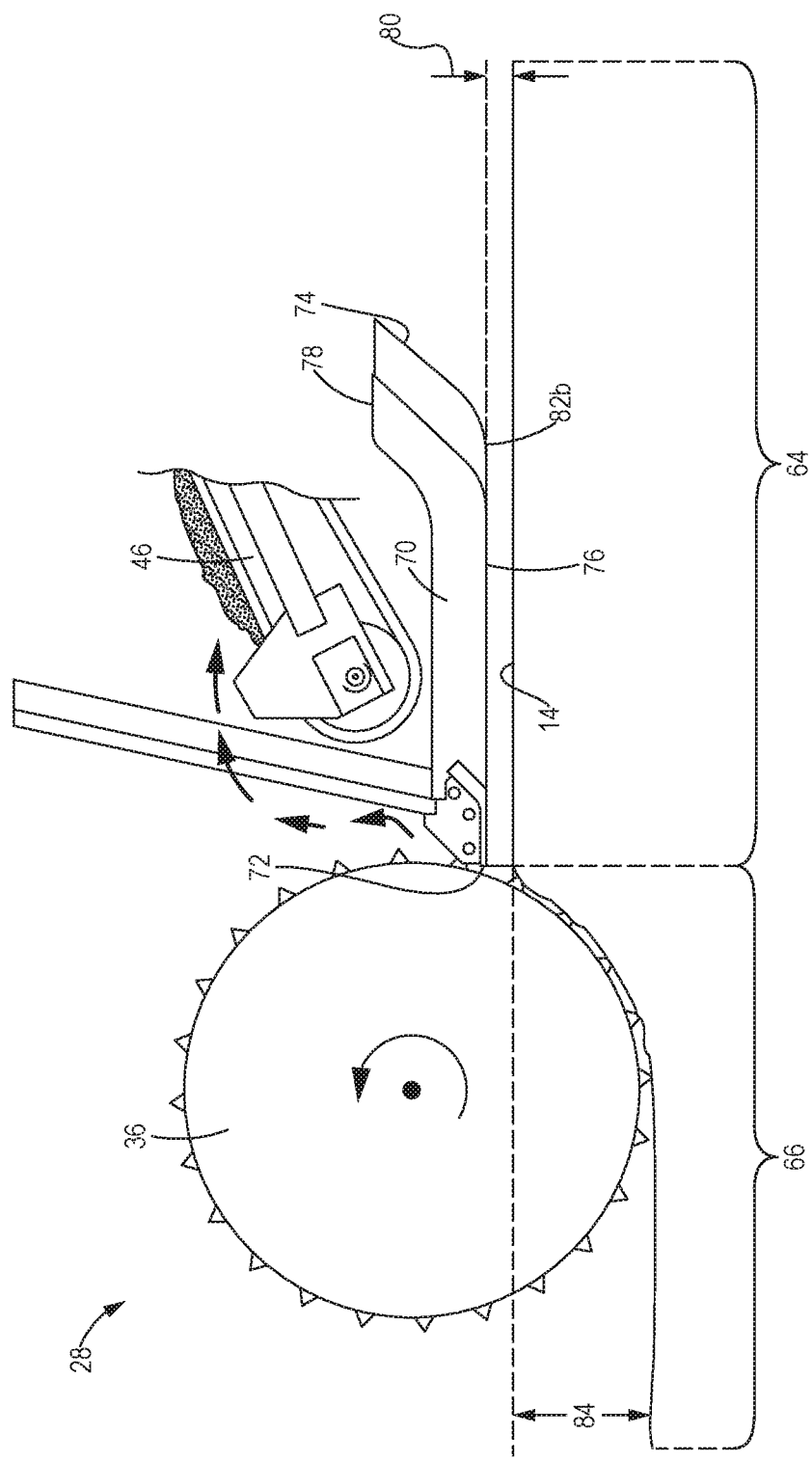
FIG. 4 is a side view of the milling system of FIG. 2 with an anti-slab positioned at a predetermined height above a portion of a roadway surface.

FIG. 3 illustrates one embodiment of the anti-slab 70 (viewed from under the anti-slab 70). During use the bottom side 76 (FIG. 2) of the anti-slab 70 may experience surface wear due to contact with the unmilled portion 64 of the roadway 14 while the cold planer 10 is moving. Furthermore, vibrations resulting from long-term continuous surface contact between the bottom side 76 and the unmilled portion 64 may adversely effect some electronic equipment connected to or mounted on the anti-slab 70. Accordingly, as shown in FIG. 4, when possible (for example, when the condition of the roadway 14 is such that slabs 68 are generally not forming or breaking off), it may be desirable to position the anti-slab 70 at a predetermined height 80 above the unmilled portion 64 of the roadway 14.

Figure 5:
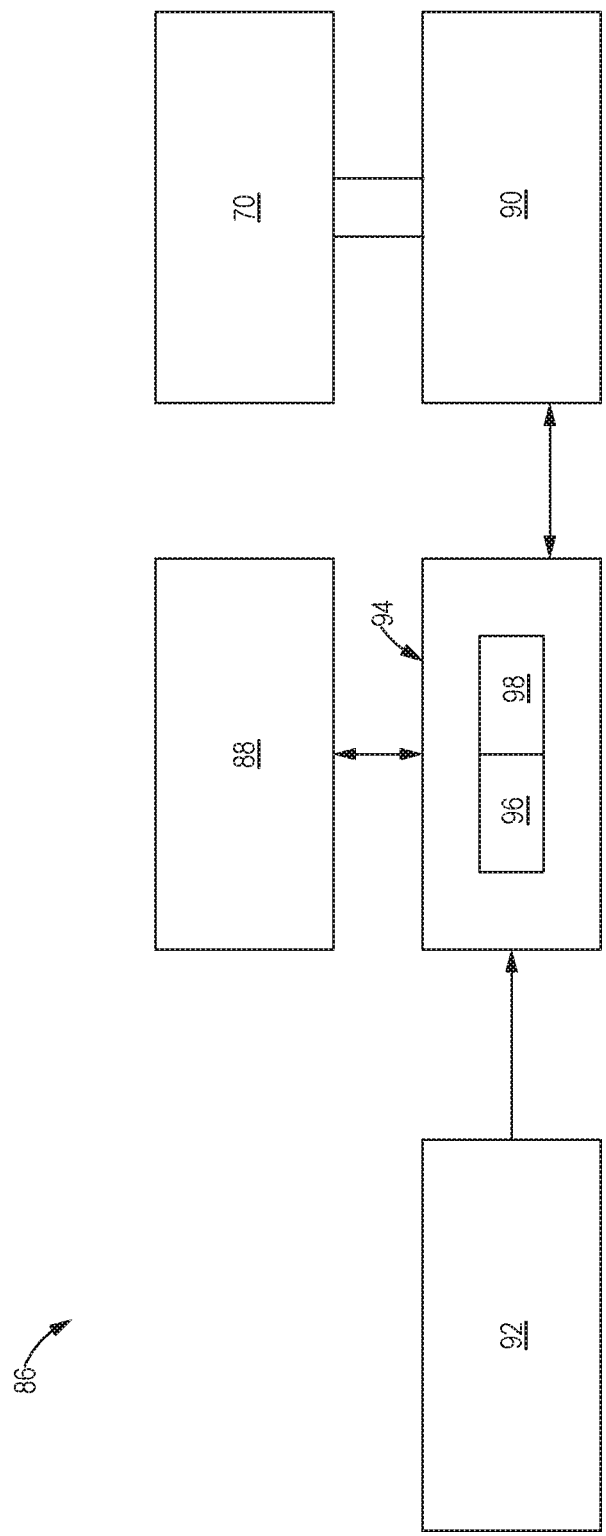
FIG. 5 is a block diagram of an exemplary anti-slab height control system.

Turning now to FIG. 5, disclosed herein is an anti-slab height control system 86 for a cold planer 10 or similar machine. The anti-slab height control system 86 comprises the anti-slab 70, one or more position sensors 88, one or more actuators 90, an anti-slab interface 92 and a controller 94.

In an embodiment, each position sensor 88 (see also FIG. 3) is configured to determine the current elevational position 82a (FIG. 2) of the anti-slab 70 and to transmit to the controller 94 (FIG. 5) position data indicative of such current elevational position 82a (FIG. 2) of the anti-slab 70. In one embodiment, the position sensor(s) 88 may be a cylinder sensor or the like. In an embodiment, the position data may be indicative of the current elevational position 82a (FIG. 2) of the anti-slab 70 relative to the cutting depth 84. The cutting depth 84 is the vertical depth of cut made in the roadway 14 by the milling drum 36. For example, a construction plan may call for the cold planer 10 to remove four inches (10.16 cm) of the roadway 14. Accordingly, one or more of the lifting columns 16 (FIG. 1) may lower the frame 18 so that the bottom of the milling drum 36 (while milling) is four inches (10.16 cm) below the surface of roadway 14. In that scenario, the cutting depth 84 is four inches (10.16 cm). Alternatively, in other embodiments, the position data may be indicative of the current elevational position 82a of the anti-slab 70 relative to a portion of the roadway 14, for example the unmilled portion 64.

Each actuator 90 (FIGS. 3 and 5) is operably connected to the anti-slab 70 and is configured to move (e.g., raise or lower) the anti-slab 70 to the predetermined height 80 based on an actuator adjustment received from the controller 94. In an embodiment, the actuator 90 may include a hydraulic cylinder, an electrical motor or the like.

The anti-slab interface 92 (FIG. 5) is configured to receive user input. The user input may include a state selection (e.g., activate, deactivate) and/or the predetermined height 80. A state selection of "activate" places the anti-slab height control system 86 in an activated state. A state selection of "deactivate" places the anti-slab height control system 86 in a deactivated state. When in the activate state, the anti-slab height control system 86 automatically controls the height of the anti-slab 70, as described herein. The anti-slab interface 92 may include, but is not limited to, a touchscreen display, a keypad, a switch, a dial, lever or the like to receive the user input. The anti-slab interface 92 is configured to transmit the user input (state selection, predetermined height 80) to the controller 94 for processing.

The controller 94 may be disposed on the cold planer 10 or may be remote from the cold planer 10. The controller 94 is in operable communication with the position sensor 88, the actuator 90 and the anti-slab interface 92. The controller 94 is configured to receive the position data from each position sensor 88 and is configured to receive the state signal from the anti-slab interface 92. The controller 94 is also configured to receive the predetermined height 80 from the anti-slab interface 92.

The controller 94 is further configured to determine an actuator adjustment to move (raise or lower the bottom side 76 of) the anti-slab 70 to the predetermined height 80 above the unmilled portion 64 of the roadway 14. The actuator adjustment is derived based on the difference between the current elevational position 82a of the anti-slab 70 and the desired elevational position 82b (FIG. 4) at which the bottom side 76 of the anti-slab 70 will be at the predetermined height 80 above the unmilled portion 64 of the roadway 14. Such desired elevational position 82b may be determined relative to the cutting depth 84.

Once calculated, the controller 94 transmits the actuator adjustment to the actuator 90, which then raises or lowers the anti-slab 70 based on the actuator adjustment. In some embodiments, this position may be held constant until a new cutting depth 84 or an updated predetermined height 80 is received by the controller 94.

The controller 94 may include a processor 96 and a memory component 98. The processor 96 may be a microprocessor or other processor as known in the art. The processor 96 may execute instructions and generate control signals for processing a signal(s) indicative of the position data, the predetermined height 80, and the cutting depth 84 and to generate or determine the actuator adjustment. Such instructions that are capable of being executed by a computer may be read into or embodied on a computer readable medium, such as the memory component 98 or provided external to the processor 96. In alternative embodiments, hard wired circuitry may be used in place of, or in combination with, software instructions to implement a control method.

The term "computer readable medium" as used herein refers to any non-transitory medium or combination of media that participates in providing instructions to the processor 96 for execution. Such a medium may comprise all computer readable media except for a transitory, propagating signal. Common forms of computer-readable media include, for example, a CD-ROM, any other optical medium, or any other medium from which a computer processor 96 can read.

The controller 94 is not limited to one processor 96 and memory component 98. The controller 94 may be several processors 96 and memory components 98.

Industrial Applicability

Figure 6:
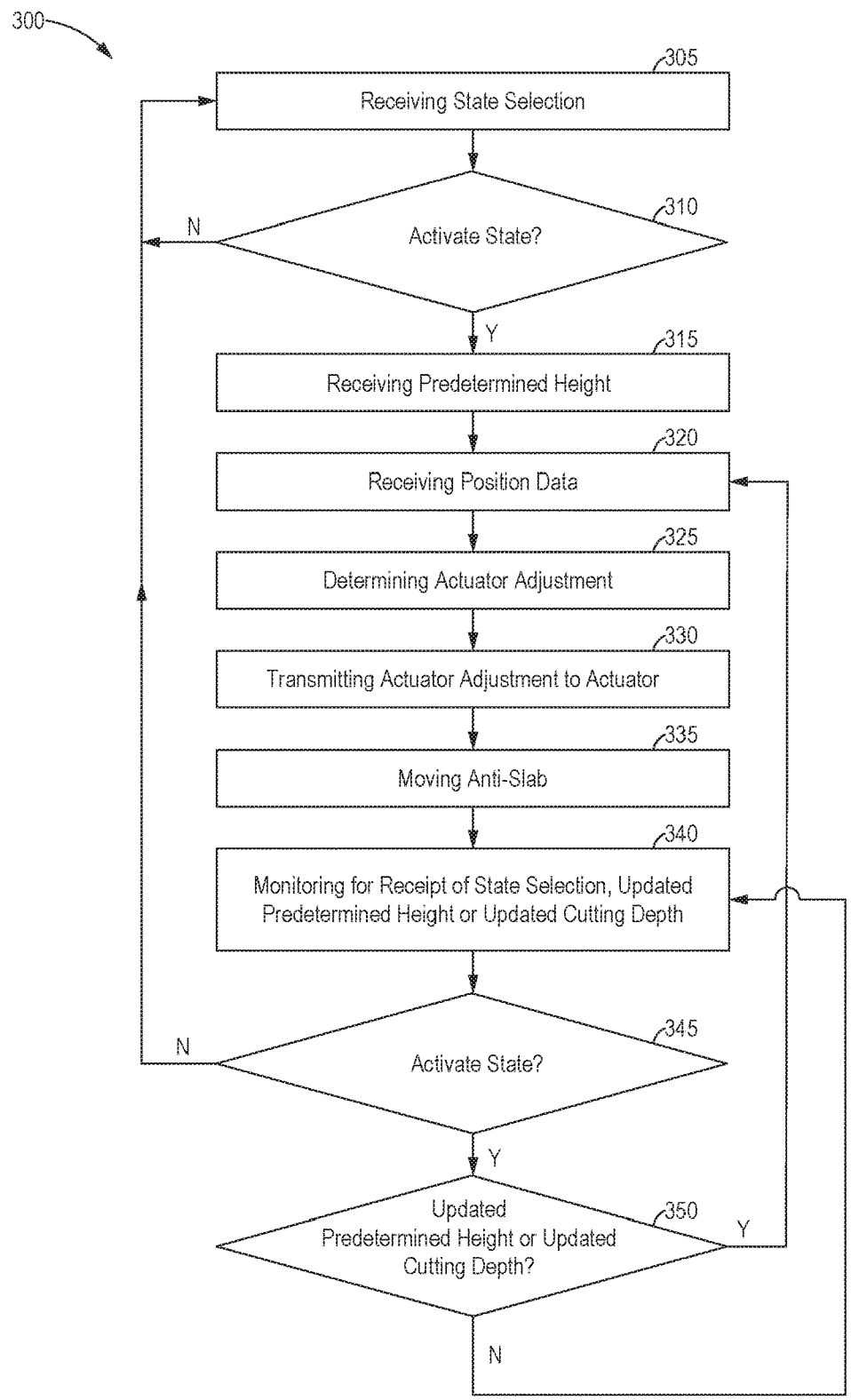
FIG. 6 is a flowchart illustrating exemplary blocks of a method of regulating anti-slab elevational position in accordance with the present disclosure.

Referring now to FIG. 6, an exemplary flowchart is illustrated showing sample blocks which may be followed to control the height of the anti-slab 70 above the unmilled portion 64 of the roadway 14. The method 300 may be practiced with more or less than the number of blocks shown and is not limited to the order shown.

Block 305 includes receiving, by the controller 94, a state selection from the anti-slab interface 92.

Block 310 includes determining, by the controller 94, if the anti-slab height control system 86 is in an activated state (if the state selection is activate). If so, the method 300 proceeds to block 315. Otherwise, the method 300 returns to block 305.

Block 315 includes receiving, by the controller 94, the predetermined height 80. The predetermined height 80 may be received from the anti-slab interface 92.

Block 320 includes receiving, by the controller 94 from the position sensor 88, position data indicative of the current elevational position 82a of the anti-slab 70.

Block 325 includes automatically determining, by the controller 94, the actuator adjustment to move (raise or lower the bottom side 76 of) the anti-slab 70 to the (requested) predetermined height 80 above the unmilled portion 64 of the roadway 14. In an embodiment, the controller 94 derives the actuator adjustment based on the difference between the current elevational position 82a of the anti-slab 70 and the desired elevational position 82b at which the bottom side 76 of the anti-slab 70 will be disposed at the (requested) predetermined height 80 above the unmilled portion 64 of the roadway 14. Such desired elevational position 82b may be determined relative to the cutting depth 84.

Block 330 includes transmitting, by the controller 94 to the actuator 90, the actuator adjustment.

Block 335 includes moving (raising or lowering) the anti-slab 70, by the actuator 90, to the predetermined height 80 based on the actuator adjustment.

Block 340 includes monitoring for receipt of another state selection, a (updated) predetermined height 80 or an updated cutting depth 84. The updated cutting depth 84 may be provided to the controller 94 by any appropriate device (e.g., a user input, another controller, or the like) in operable communication with the controller 94 of the anti-slab height control system 86.

Block 345 includes determining, by the controller 94, if the anti-slab height control system 86 is (still) in the activated state. If so, the method 300 proceeds to block 350. Otherwise, the method 300 returns to block 305.

Block 350 includes determining, by the controller 94, if an (updated) predetermined height 80 or an (updated) cutting depth 84 has been received by the controller 94. If yes, the method proceeds to block 320. If so, the method 300 returns to block 340.

Also disclosed is a method of controlling an anti-slab 70 mounted on a cold planer 10 that includes a frame 18 and a milling drum 36 mounted to the frame 18 and disposed at a cutting depth 84. The method may comprise: receiving, by a controller 94, position data from a position sensor 88, the position data indicative of a current elevational position 82a of the anti-slab 70; determining, by the controller 94, a first actuator adjustment, the first actuator adjustment based on a first predetermined height 80, the position data and a first cutting depth 84 of the milling drum 36; and automatically raising or lowering the anti-slab 70, by an actuator 90 operably connected to the anti-slab 70, from a current elevational position 82a to a first elevational position 82b based on the first actuator adjustment, wherein a bottom side 76 of the anti-slab 70 is disposed at the first predetermined height 80 above the roadway 14 when the anti-slab 70 is in the first elevational position 82b.

Further disclosed is a method of regulating an elevational position of an anti-slab 70 mounted on a cold planer 10. The cold planer 10 includes a frame 18 and a milling drum 36 mounted to the frame 18 and disposed at a cutting depth 84. The method may comprise: receiving, by a controller 94, a state selection from an anti-slab interface 92, wherein the state selection is one of activate or deactivate; receiving, by the controller 94, position data from a position sensor 88, the position data indicative of a current elevational position 82a of the anti-slab 70; determining, by the controller 94, a first actuator adjustment based on a first predetermined height 80, the position data, and a first cutting depth 84 of the milling drum 36; transmitting, by the controller 94, the first actuator adjustment to an actuator 90 operatively connected to the anti-slab 70; and if the state selection is activate, moving the anti-slab 70, by the actuator 90, from the current elevational position 82a to a first elevational position 82b, wherein a bottom side 76 of the anti-slab 70 is disposed at the first predetermined height 80 above an unmilled portion 64 of the roadway 14 when the anti-slab 70 is in the first elevational position 82b.

The features disclosed herein may be particularly beneficial for use with cold planers 10 or similar machines for which is may be beneficial to automatically, in certain scenarios, raise or lower the anti-slab 70 with respect to the roadway 14. In particular, the ability to automatically control the height of an anti-slab 70 reduces the wear on the anti-slab 70 during periods in which a downward force does not need to be exerted on the roadway 14 by the anti-slab 70.

The above description is meant to be representative only, and thus modifications may be made to the embodiments described herein without departing from the scope of the disclosure.

Thus, these modifications fall within the scope of present disclosure and are intended to fall within the appended claims.

What is claimed is:

1. An anti-slab height control system for a cold planer configured for milling a roadway, the cold planer including a frame and a milling drum mounted to the frame, the anti-slab height control system comprising:
   an anti-slab mounted on the cold planer, the anti-slab including a bottom side;
   a position sensor in operable communication with a controller, the position sensor configured to transmit position data to the controller, the position data indicative of a current elevational position of the anti-slab;
   the controller in operable communication with an actuator, the controller configured to determine a first actuator adjustment based on a first predetermined height, the position data and a first cutting depth of the milling drum, the controller further configured to transmit to the actuator the first actuator adjustment; and
   the actuator operably connected to the anti-slab and configured to move the anti-slab based on the first actuator adjustment from the current elevational position to a first elevational position, wherein the bottom side of the anti-slab is disposed at the first predetermined height above an unmilled portion of the roadway when the anti-slab is in the first elevational position.

2. The anti-slab height control system according to claim 1, further comprising an anti-slab interface in operable communication with the controller, the anti-slab interface configured to receive from a user and to transmit to the controller a state selection.

3. The anti-slab height control system according to claim 2, wherein the state selection is one of activate or deactivate, wherein further transmission of the first actuator adjustment to the actuator does not occur when the state selection is deactivate.

4. The anti-slab height control system according to claim 1, further comprising an anti-slab interface in operable communication with the controller, the anti-slab interface configured to receive the first predetermined height from a user and to transmit to the controller the first predetermined height.

5. The anti-slab height control system according to claim 1, in which the controller is further configured to determine a second actuator adjustment based on a second predetermined height, the position data and the first cutting depth, and the actuator is further configured to move the anti-slab based on the second actuator adjustment to a second elevational position, wherein the bottom side of the anti-slab is disposed at the second predetermined height above an unmilled portion of the roadway when the anti-slab is in the second elevational position.

6. The anti-slab height control system according to claim 1, in which the controller is further configured to determine a second actuator adjustment based on the first predetermined height, the position data and a second cutting depth, and the actuator is further configured to move the anti-slab based on the second actuator adjustment to a second elevational position, wherein the bottom side of the anti-slab is disposed at the first predetermined height above an unmilled portion of the roadway when the anti-slab is in the second elevational position.

7. A method of controlling an anti-slab mounted on a cold planer, the cold planer including a frame and a milling drum mounted to the frame and disposed at a cutting depth, the method comprising:
   receiving, by a controller, position data from a position sensor, the position data indicative of a current elevational position of the anti-slab;
   determining, by the controller, a first actuator adjustment, the first actuator adjustment based on a first predetermined height, the position data and a first cutting depth of the milling drum; and
   automatically raising or lowering the anti-slab, by an actuator operably connected to the anti-slab, from a current elevational position to a first elevational position based on the first actuator adjustment, wherein a bottom side of the anti-slab is disposed at the first predetermined height above a roadway when the anti-slab is in the first elevational position.

8. The method according to claim 7 further comprising receiving, by the controller, a state selection, wherein the state selection is one of activate or deactivate.

9. The method according to claim 8, wherein the automatically raising or lowering of the anti-slab does not occur when the state selection is deactivate.

10. The method according to claim 8, wherein the automatically raising or lowering of the anti-slab only occurs when the state selection is activate.

11. The method according to claim 7, wherein the first predetermined height is received from a user interface.

12. The method according to claim 7 further comprising:
   receiving, by the controller, a second cutting depth;
   receiving updated position data from the position sensor;
   determining, by the controller, a second actuator adjustment, the second actuator adjustment based on the first predetermined height, the updated position data and the second cutting depth; and
   automatically raising or lowering the anti-slab, by the actuator, to a second elevational position based on the second actuator adjustment, wherein the bottom side of the anti-slab is disposed at the first predetermined height when the anti-slab is in the second elevational position.

13. The method according to claim 12 further comprising:
receiving, by the controller, a state selection, wherein, when the state selection is activate, a distance between the bottom side of the anti-slab and the roadway remains constant when the cutting depth varies.

14. A method of regulating an elevational position of an anti-slab mounted on a cold planer, the cold planer including a frame and a milling drum mounted to the frame, the milling drum disposed at a cutting depth, the method comprising:
receiving, by a controller, a state selection from an anti-slab interface, wherein the state selection is one of activate or deactivate;
receiving, by the controller, position data from a position sensor, the position data indicative of a current elevational position of the anti-slab;
determining, by the controller, a first actuator adjustment based on a first predetermined height, the position data, and a first cutting depth of the milling drum;
transmitting, by the controller, the first actuator adjustment to an actuator operatively connected to the anti-slab; and
if the state selection is activate, moving the anti-slab, by the actuator, from the current elevational position to a first elevational position, wherein a bottom side of the anti-slab is disposed at the first predetermined height above an unmilled portion of a roadway when the anti-slab is in the first elevational position.

15. The method according to claim 14 further comprising:
receiving, by the controller, a second predetermined height;
receiving, by the controller, updated position data from the position sensor;
determining, by the controller, a second actuator adjustment based on the second predetermined height, the updated position data, and the first cutting depth.

16. The method according to claim 15 further comprising:
transmitting, by the controller, the second actuator adjustment to the actuator; and
if the state selection is activate, moving by the actuator, the anti-slab to a second elevational position, wherein the bottom side of the anti-slab is disposed at the second predetermined height above the unmilled portion of the roadway when the anti-slab is in the second elevational position.

17. The method according to claim 15, wherein the second predetermined height is received from the anti-slab interface.

18. The method according to claim 14, further comprising:
receiving, by the controller, a second cutting depth;
receiving, by the controller, updated position data from the position sensor; and
determining, by the controller, a second actuator adjustment based on the first predetermined height, the updated position data and the second cutting depth.

19. The method according to claim 18, further comprising:
transmitting, by the controller, the second actuator adjustment to the actuator; and
if the state selection is activate, moving by the actuator the anti-slab to a second elevational position, wherein the bottom side of the anti-slab is disposed at the first predetermined height above the unmilled portion of the roadway when the anti-slab is in the second elevational position.

20. The method according to claim 14 further comprising:
receiving, by the controller, a state selection, wherein, when the state selection is activate, a distance between the bottom side of the anti-slab and the unmilled portion of the roadway remains constant when the cutting depth varies.

* * * * *